(12) United States Patent
Klitting et al.

(10) Patent No.: US 11,548,418 B2
(45) Date of Patent: Jan. 10, 2023

(54) VEHICLE SEAT

(71) Applicant: Faurecia Sièges d'Automobile, Nanterre (FR)

(72) Inventors: Rémi Klitting, Brières-les-Scellés (FR); Emmanuel Liegeois, Brières-les-Scellés (FR); Frederic Pinto, Brières-les-Scellés (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 17/390,964

(22) Filed: Jul. 31, 2021

(65) Prior Publication Data

US 2022/0032826 A1 Feb. 3, 2022

(30) Foreign Application Priority Data

Jul. 31, 2020 (FR) ....................... 2008142

(51) Int. Cl.
*B60N 2/30* (2006.01)
*B60N 2/22* (2006.01)
*B60N 2/68* (2006.01)

(52) U.S. Cl.
CPC .......... *B60N 2/3011* (2013.01); *B60N 2/2222* (2013.01); *B60N 2/682* (2013.01)

(58) Field of Classification Search
CPC .. B60N 2/3011; B60N 2/3009; B60N 2/3004; B60N 2/2222; B60N 2/22; B60N 2/20; B60N 2/682; B60N 2002/684

(Continued)

(56) References Cited

U.S. PATENT DOCUMENTS 4,869,541 A * 9/1989 Wainwright ............. B60N 2/36 296/65.09
4,958,877 A * 9/1990 Lezotte .................... B60N 2/36 296/65.17

(Continued)

FOREIGN PATENT DOCUMENTS

CN 109383330 * 2/2019
DE 102012012358 A1 12/2013

(Continued)

OTHER PUBLICATIONS

French Search Report corresponding to French Application No. FR 2008142, dated May 23, 2021, 2 pages.

(Continued)

*Primary Examiner* — Mark R Wendell
(74) *Attorney, Agent, or Firm* — Reising Ethington P.C.

(57) ABSTRACT

A vehicle seat that accommodates at least two users includes a seating portion frame, a first backrest and a second backrest which are pivotally hinged to the seating portion frame according to a transverse axis, via a common hinge. The common hinge includes: a pivot pin comprising a first lateral portion, and a first housing arranged on the first backrest and receiving interiorly the first lateral portion by authorizing the rotation of the first backrest. The first lateral portion has a protruding rib and the first housing has a substantially keyhole shape, complementary with the radial section of the first lateral portion. The rib is oriented, according to an angle of between 30° and 60° relative to the vertical direction of the vehicle seat.

19 Claims, 5 Drawing Sheets

(58) Field of Classification Search
USPC .................................................... 297/378.1
See application file for complete search history.

(56) References Cited

U.S. PATENT DOCUMENTS

| | | | |
|---|---|---|---|
| 5,700,058 A * | 12/1997 | Balagurumurthy | ........................ B60N 2/42709 297/440.15 |
| 2011/0187168 A1 | 8/2011 | Zorine | |
| 2014/0159449 A1* | 6/2014 | Kamper | ................... B60N 2/22 29/525.01 |
| 2020/0171990 A1* | 6/2020 | Hong | ..................... B60N 2/682 |
| 2022/0032824 A1* | 2/2022 | Macias | ..................... B60N 2/36 |
| 2022/0153174 A1* | 5/2022 | Lee | ....................... B60N 2/2209 |

FOREIGN PATENT DOCUMENTS

| FR | 2702428 | * | 9/1994 |
| FR | 3027566 | A1 | 4/2016 |
| WO | 2010009321 | A1 | 1/2010 |

OTHER PUBLICATIONS

Written Opinion corresponding to French Application No. FR 2008142, dated May 23, 2021, 5 pages.

* cited by examiner

VEHICLE SEAT

TECHNICAL FIELD

The invention relates to a vehicle seat, configured to accommodate at least two users, and in particular an automobile vehicle seat, as well as a method for manufacturing such a seat, and a vehicle equipped with such a seat.

The invention relates to the field of vehicle seats configured so as to accommodate at least two users, belonging for example to a vehicle bench, which also generally comprises one or more seats, and is provided to accommodate several users, sitting side by side.

BACKGROUND

In a well-known manner, a vehicle generally comprises at least one seat intended for accommodating a driver or a passenger of the vehicle, hereinafter designated by the term "user". The seat can be intended for accommodating a single person or several persons sitting side by side, and can be disposed at the front or at the rear of the vehicle. The seat can also be part of a bench that can accommodate several persons side by side.

Thus, in terms of the invention, the term "seat" according to the invention designates a front seat of the vehicle as well as a rear seat of the vehicle. Likewise, the invention can be implemented for seats intended for any type of vehicle and in particular automobile vehicles.

A vehicle seat generally comprises a seating portion frame, provided to be connected to the floor of a vehicle.

A vehicle seat, which is provided to accommodate at least two passengers side by side, also comprises at least one first backrest, pivotally hinged according to the transverse axis of the seat to the seating portion frame, as well as one second backrest, also pivotally hinged to the seating portion frame according to said transverse axis.

In a known manner, a common hinge at the seating portion frame can be provided for the first backrest and the second backrest, at an intermediate zone of the seating portion frame, in the transversal direction of the seat, comprising a common pivot pin received simultaneously in a corresponding housing, arranged in each one of the first and of the second backrest, and so as to allow for the hinging of the first backrest and of the second backrest relative to the seating portion frame.

Such a common pivot pin is fastened to the seating portion frame, so as to remain immobile relative to the latter.

Generally, the pivot pin comprises a central portion, a first lateral portion and a second lateral portion, the two lateral portions being positioned on either side of the central portion according to the axis of the pivot pin.

Moreover, the first backrest generally comprises a first wall wherein a first housing is arranged receiving interiorly the first lateral portion of the pivot pin, by authorizing the rotation of the pivot pin relative to said housing, about the axis of the pivot pin.

In the same way, the second backrest generally comprises a second wall wherein a second housing is arranged receiving interiorly the second lateral wall of the pivot pin, by authorizing the rotation of the pivot pin relative to said housing, about the axis of the pivot pin.

A rib protruding in a radial direction can be provided on the first lateral portion of the pivot pin of the pivot pin and extending opposite the axis of the pivot pin.

Also, the first housing can have a substantially keyhole shape, complementary with the radial section of the first lateral portion of the pivot pin and of the rib, with a circular portion and a substantially rectangular portion communicating together, the substantially rectangular portion being positioned above the circular portion of the first housing, in the vertical direction of the seat, when the first backrest is in a raised position, oriented substantially in the vertical direction of the seat.

So as to prevent the sliding of the first backrest relative to the pivot pin along the axis of the pivot pin, after the mounting of the first backrest on the pivot pin, said first housing and said first lateral portion of the pivot pin can be configured in such a way that:

in a first position of the first backrest relative to the pivot pin about the axis of the pivot pin, the first lateral portion and the rib are able to slide through the first housing according to the axis of the pivot pin, and in at least one second position of the first backrest relative to the pivot pin about the axis of the pivot pin, the sliding of the first lateral portion and the rib through the first housing, according to the axis of the pivot pin, is prevented, the rib being, at least partially, facing the first wall in the vicinity of the first housing, and facing the first backrest in the extension of the latter at the front in the longitudinal direction of the seat.

Generally, the rib is oriented, from the bottom upwards in the clockwise direction, with an angle comprised between −20° and +20° relative to the vertical direction of the seat about the axis of the pivot pin.

According to the observances of the inventor, such a positioning of the rib relative to the vertical direction of the seat has the major disadvantage that during an impact received by said seat, and in particular by the first backrest, when said first backrest is oriented substantially in the vertical direction of the seat, for example in case of projection of an element located at the rear of the seat against said first backrest, such as for example baggage located in the boot of the vehicle receiving said seat, said rib will abut against said first wall of the first backrest and damage the latter and deform the first housing. Thus, the shape of the first housing is no longer adapted to prevent the sliding of the first lateral portion and the rib through the first housing according to the axis of the pivot pin in said or in each one of said second positions. The first backrest then risks disengaging from the pivot pin, which represents a high risk for the safety of a user received on said first backrest of the seat, who is, in the normal position of use, oriented substantially in the vertical direction of the seat.

SUMMARY

The invention overcomes these disadvantages of vehicle seats of the prior art, configured so as to receive at least two users, by proposing a vehicle seat configured to accommodate at least two users, increasing the resistance of the fastening between the first backrest and the seating portion frame.

Another purpose of the present invention is to propose such a vehicle seat that facilitates the mounting of the first backrest on the seating portion frame, and that reduces mounting time.

Another purpose of the present invention is to propose such a vehicle seat of simple design and of reduced cost price.

A vehicle seat configured to accommodate at least two users is proposed, comprising:

a seating portion frame, intended for being connected to the floor of a vehicle, a first backrest pivotally hinged to the seating portion frame according to the transverse axis of the seat, a second backrest pivotally hinged to the seating portion frame according to the transverse axis of the seat.

According to the invention, the first backrest and the second backrest are connected to the seating portion frame via a common hinge, positioned in an intermediate zone of the seating portion frame, in the transversal direction of the seat.

According to the invention, said common hinge includes:

a pivot pin of an axis coincident with the transverse axis of the seat, comprising at least one central portion, a first lateral portion and a second lateral portion, the two lateral portions being positioned on either side of the central portion according to the axis of the pivot pin, a first housing arranged on the first backrest and receiving interiorly the first lateral portion of the pivot pin, by authorizing the rotation of the first backrest relative to the pivot pin about the axis of said pivot pin, a second housing arranged on the second backrest and receiving interiorly the second lateral portion of the pivot pin, by authorizing the rotation of the second backrest relative to the pivot pin about the axis of said pivot pin, a third housing arranged on the seating portion frame, and receiving interiorly the central portion of the pivot pin, the central portion being maintained immobile in the third housing and so that the pivot pin is maintained immobile relative to the seating portion frame.

According to the invention, a first lateral portion has a rib protruding in a radial direction from the pivot pin and extending opposite the axis of the pivot pin.

According to the invention, the first housing has a substantially keyhole shape, complementary with the radial section of the first lateral portion of the pivot pin and of the rib, with a circular portion of centre and a substantially rectangular portion communicating together, the substantially rectangular portion being positioned above the circular portion of the first housing, in the vertical direction of the seat, when the first backrest is in a raised position, oriented substantially in the vertical direction of the seat.

According to the invention, said first housing and said first lateral portion of the pivot pin are configured so that:

in a first position of the first backrest, relative to the pivot pin about the axis of the pivot pin, the first lateral portion and the rib are able to slide through the first housing according to the axis of the pivot pin, and in at least one second position of the first backrest relative to the pivot pin about the axis of the pivot pin, the sliding of the first lateral portion and the rib through the first housing according to the axis of the pivot pin, is prevented, the rib being, at least partially, facing the first wall in the vicinity of the first housing, in the direction of the axis of the pivot pin.

According to the invention, the rib is oriented, from the bottom upwards in the clockwise direction, according to an angle comprised between 30° and 60°, preferably between 35° and 55° relative to the vertical direction of the seat about the axis of the pivot pin.

According to optional characteristics of the invention, taken individually or in combination:

the rib has a radial symmetrical substantially rectangular section relative to an axis passing through the axis of the pivot pin and the first lateral portion has a radial substantially circular section centred on the axis of the pivot pin, and the radial section of the rib is of a shape substantially identical to the substantially rectangular portion of the second housing and the radial section of the first lateral portion is of a shape that is substantially identical to the circular portion of the first housing;

the rib has a radial end face positioned at a distance from the axis of the pivot pin strictly greater than the radius of the circular portion of the first housing;

the radius of the circular portion of the first housing is substantially equal, to the nearest sliding clearance, to the radius of the radial section of the first lateral portion of the pivot pin;

the substantially rectangular portion of the first housing has an axis of symmetry passing through the centre of the circular portion, and the first backrest has a support wall of the back of a user, substantially planar extending in a plane, configured to receive as support, via a backrest cushion the back of a user, the axis of symmetry of the substantially rectangular portion of the first housing extending substantially parallel to the plane of the backrest;

the first wall of the first backrest extends protruding from the support wall of the first backrest, in a direction substantially perpendicular to the plane of said support wall, the first wall has a first portion extending in the vicinity of the first housing between the axis of symmetry of the substantially rectangular portion of the first housing and the plane of the support wall of the first backrest, and defining an angle comprised between 30° and 60°, preferably between 40° and 50° relative to the axis of symmetry of the substantially rectangular portion of the first housing, from the circular portion to the substantially rectangular portion in the clockwise direction, and the first wall has a second portion extending in the vicinity of the circular portion of the first housing, and defining an angle comprised between −20° and +20°, preferably between −10° and +10° relative to the axis of symmetry of the substantially rectangular portion of the first housing, from the circular portion to the substantially rectangular portion in the clockwise direction, the first position of the first wall having a resistance to shearing in the direction of the axis of the pivot pin greater than that of the second portion;

the first portion has a resistance to shearing in the direction of the axis of the pivot pin comprised between 500 MPa and 900 MPa, preferably between 600 MPa and 800 MPa;

the rib is provided to be facing the first position of the first wall of the first backrest, in the transversal direction of the seat, when the backrest is oriented substantially in the vertical direction of the seat;

the first backrest has a first width in the transversal direction of the seat and the second backrest has a second width in the transversal direction of the seat, the first width of the first backrest being strictly less than the second width of the second backrest, more preferably such that the width of the first backrest is substantially equal to ⅔ of the width of the second backrest;

the rib is referred to as first rib, the first lateral portion having a second rib protruding in a radial direction from the pivot pin and extending opposite the axis of the pivot pin, of radial section substantially identical to the radial section of the first rib and positioned facing and in the extension of said first rib in the direction of the axis of the pivot pin, the first rib and the second rib being separated by a distance, in the direction of the axis of the pivot pin, substantially equal to the thickness of the first wall of the first backrest, to the nearest pivot clearance.

The invention also relates to a method for manufacturing a seat according to the invention, comprising:
- a fastening of the pivot pin to the frame of the seat in such a way that the rib is oriented, from the bottom upwards in the clockwise direction, with an angle comprised between 30° and 60°, preferably between 35° and 55° relative to the vertical direction of the seat about the axis of the pivot pin,
- the sliding of the first backrest relative to the pivot pin according to the axis of the pivot pin with the backrest being in said first position relative to the pivot pin about the axis of the pivot pin, in such a way that the first lateral portion and the rib slide through the first housing according to the axis of the pivot pin,
- the pivoting of the first backrest about the axis of the pivot pin so that the backrest is in said at least one second position of the first backrest relative to the pivot pin about the axis of the pivot pin, so that the rib is, at least partially, facing the first wall of the first backrest in the vicinity of the first housing, in the direction of the axis of the pivot pin.

The invention finally relates to a vehicle comprising at least one seat according to the invention.

According to an embodiment of the vehicle, the first backrest is positioned substantially at the centre of the vehicle in the transversal direction of the vehicle, and the second backrest is positioned in the vicinity of a lateral end of the vehicle, and in particular in the vicinity of a lateral door of the vehicle.

The characteristics mentioned in the following paragraphs can, optionally, be implemented. They can be implemented independently from one another or in combination with one another.

BRIEF DESCRIPTION OF THE DRAWINGS

Other characteristics, details and advantages of the invention shall appear when reading the detailed description hereinafter, and when analyzing the accompanying drawings, wherein.

DESCRIPTION OF EMBODIMENTS

The drawings and the description hereinafter contain, for the most part, elements of a certain nature. They can therefore not only be used to better understand the present invention, but also to contribute to the definition thereof, where applicable.

Figure 1:
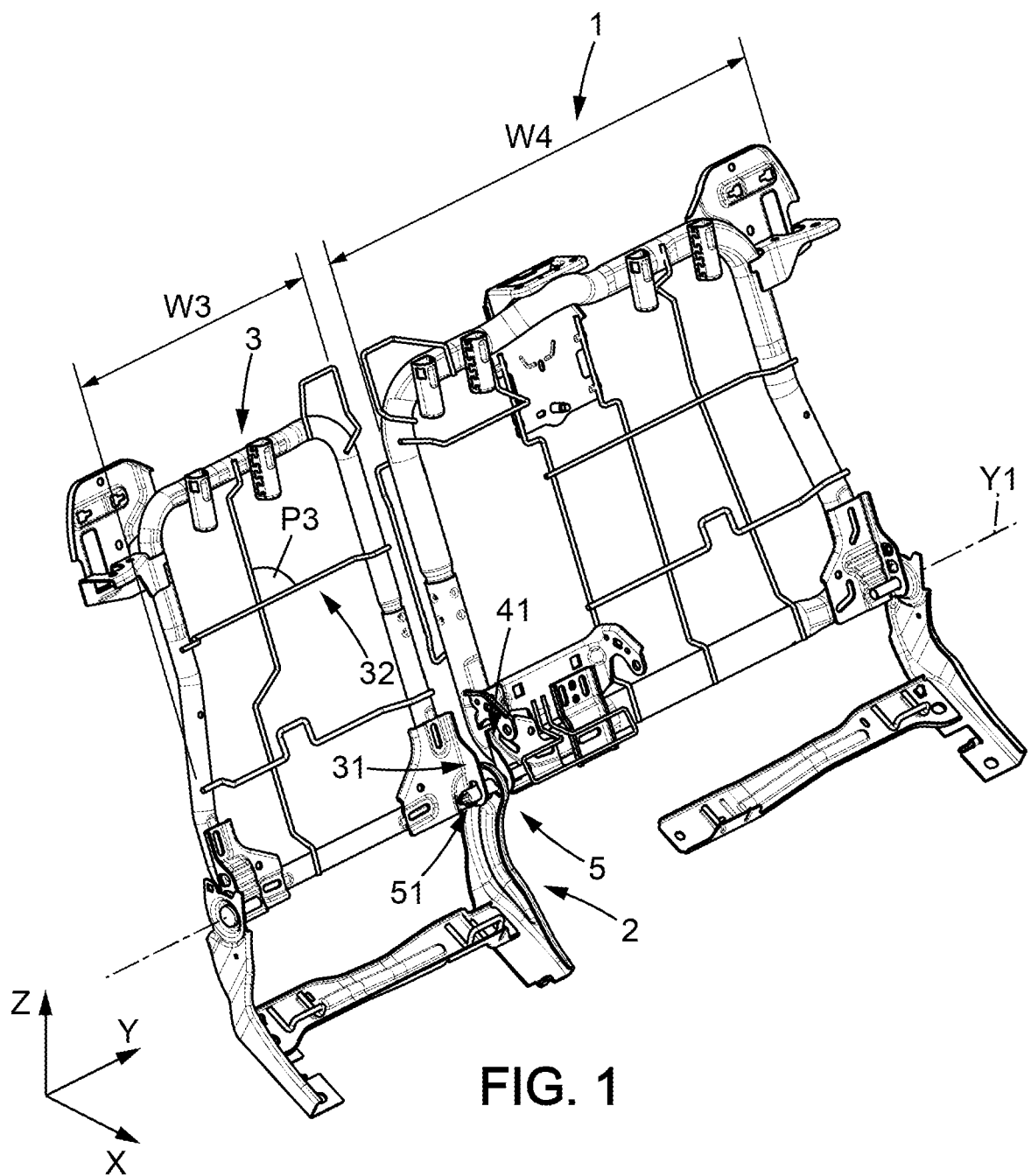
FIG. 1 shows a perspective view of a vehicle seat according to an embodiment in accordance with the invention.
Figure 2:
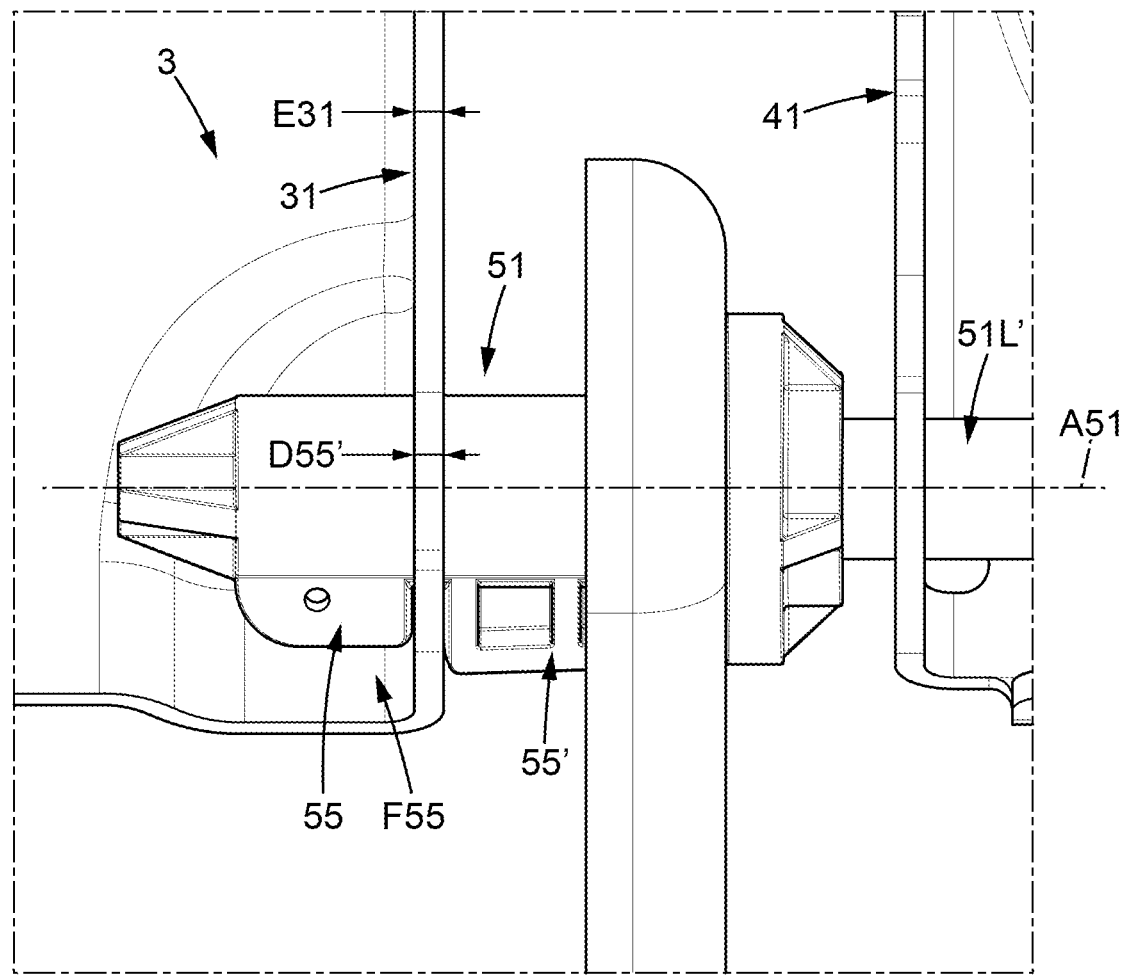
FIG. 2 shows a detailed view of the face of the common hinge of the seat of FIG. 1.
Figure 3:
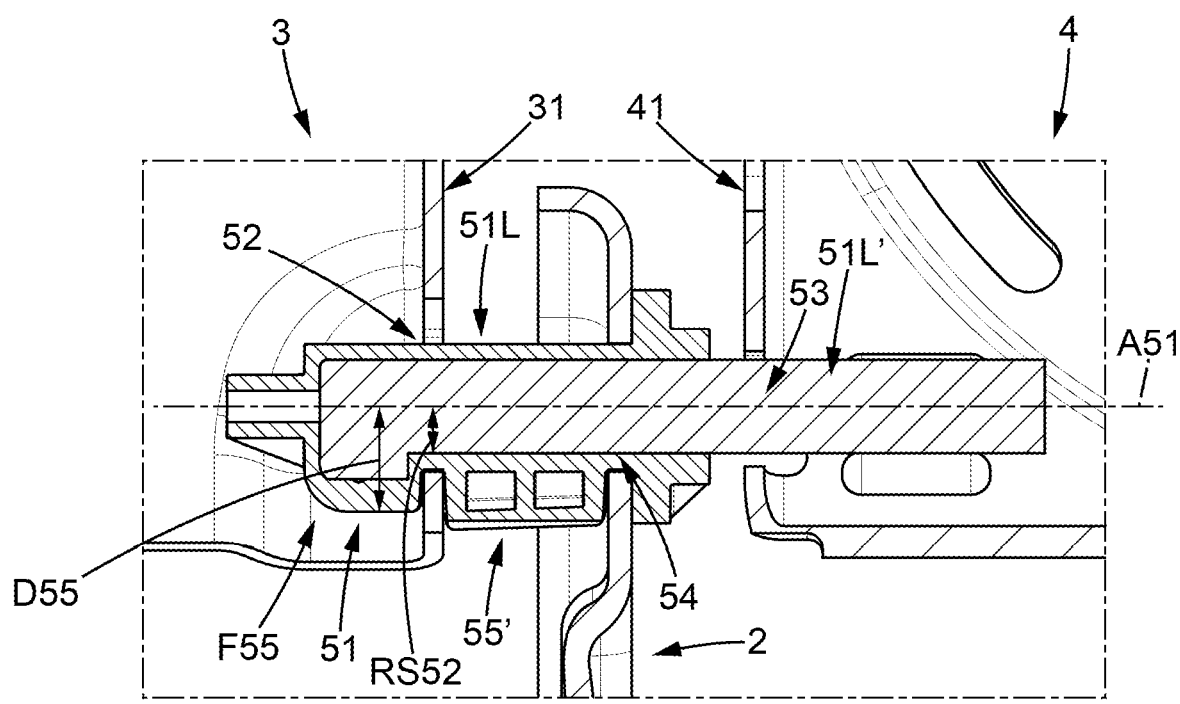
FIG. 3 shows a detailed cross-section view according to the line III-III of FIG. 1.

In the whole of the present application, the directions in space are defined as follows:
- the longitudinal direction X of the seat corresponds to the direction of sliding of the seat relative to the floor of the vehicle along sliders, when the seat includes sliders as connection means to the floor of the vehicle, received on the lower frame of the seat, as shown in the embodiments of FIG. 1,
- the vertical direction Z of the seat corresponds to the direction perpendicular to the plane of floor of the vehicle to which the seat is fastened, also perpendicular to the longitudinal direction of the seat defined hereinabove, as shown in the embodiments of FIG. 1,
- the transversal direction Y of the seat is the direction perpendicular to the longitudinal direction and to the vertical direction, as shown in the embodiments of FIG. 1.

An axis is defined as a straight line according to a determined direction and, optionally with a determined sense. For example, a longitudinal axis is an axis according to said longitudinal direction.

For a revolving part, an axial direction is defined as a direction parallel to its axis of revolution and a radial direction is a direction that cuts the axis of revolution and is perpendicular to the latter.

Also front and rear are to be understood according to said longitudinal direction of the seat, with an orientation from the rear edge of the seating portion frame, at which a seat backrest is hinged towards the front edge of the seating portion frame.

Likewise, upper and lower are to be understood in the vertical direction of the seat, with an orientation from the connection means to the floor of the vehicle, and in particular the sliders towards the backrest of the seat.

Finally, in the whole of the present application, substantially longitudinal, transversal, vertical, axial or radial means an orientation relative to the longitudinal direction, the transversal direction, the vertical direction, an axial direction or a radial direction, with an angle less than 30°, which can advantageously be zero.

Likewise, substantially parallel means an orientation relative to a given element with an angle less than 30°, which can advantageously be zero.

The invention relates, as can be seen in the embodiment of FIG. 1, to a vehicle seat 1 configured to accommodate at least two users, comprising:
- a seating portion frame 2, intended for being connected to the floor of a vehicle,
- a first backrest 3 which is pivotally hinged to the seating portion frame 2 according to the transverse axis Y1 of the seat 1,
- a second backrest 4 which is pivotally hinged to the seating portion frame 2 according to the transverse axis Y1 of the seat 1.

According to the invention, the first backrest 3 and the second backrest 4 are connected to the seating portion frame 2 via a common hinge 5, positioned in an intermediate zone Z12 of the seating portion frame 2, in the transversal direction Y of the seat 1.

According to the invention, said common hinge 5 includes:
- a pivot pin 51 of an axis A51 coincident with the transverse axis Y1 of the seat 1, comprising a central portion 51C, a first lateral portion 51L and a second lateral portion 51L', the two lateral portions 51L, 51L' being positioned on either side of the central portion 51C according to the axis A51 of the pivot pin 51
- a first housing 52 arranged on a first wall 31 of the first backrest 3 and receiving interiorly the first lateral portion 51L of the pivot pin 51, by authorizing the rotation of the first backrest 3 relative to the pivot pin 51 about the axis A51 of said pivot pin 51, a second housing 53 arranged on a second wall 41 of the second backrest 4 and receiving interiorly the second lateral portion 51L' of the pivot pin 51, by authorizing the rotation of the second backrest 4 relative to the pivot pin 51 about the axis A51 of said pivot pin 51, a third housing 54, arranged on the seating portion frame 2, and receiving interiorly the central portion 51C of the pivot pin 51, the central portion 51C being maintained immobile in the third housing 54 and so that the pivot pin 51 is maintained immobile relative to the seating portion frame 2.

According to the invention, the first lateral portion 51L has a rib 55 protruding in a radial direction from the pivot pin 51 and extending opposite the axis A51 of the pivot pin 51.

According to the invention, the first housing 52 has a substantially keyhole shape, complementary with the radial section of the first lateral portion 51L of the pivot pin 51 and of the rib 55, with a circular portion S52 of centre C52 and a substantially rectangular portion R52 communicating together, the substantially rectangular portion R52 being positioned above the circular portion S52 of the first housing 52, in the vertical direction Z of the seat 1, when the first backrest 3 is in a raised position, oriented substantially in the vertical direction Z of the seat 1.

According to the invention, said first housing 52 and said first lateral portion 51L of the pivot pin 51 are configured so that:

in a first position of the first backrest 3, relative to the pivot pin 51 about the axis A51 of the pivot pin 51, the first lateral portion 51L and the rib 55 are able to slide through the first housing 52 according to the axis A51 of the pivot pin 51, and in at least one second position of the first backrest 3 relative to the pivot pin 51 about the axis A51 of the pivot pin 51, the sliding of the first lateral portion 51L and the rib 55 through the first housing 52 according to the axis A51 of the pivot pin 51, is prevented, the rib 55 being, at least partially, facing the first wall 31 in the vicinity of the first housing 52, in the direction of the axis A51 of the pivot pin 51.

As can be seen in the embodiments of FIGS. 1 to 5, in said at least one second position of the first backrest 3 relative to the pivot pin 51, the rib 55 can be provided to be located facing the first backrest 3 in the extension in front of the latter in the longitudinal direction X of the seat 1.

According to the invention, the rib 55 is oriented, from the bottom upwards in the clockwise direction, according to an angle A55 comprised between 30° and 60°, preferably between 35° and 55° relative to the vertical direction Z of the seat 1 about the axis A51 of the pivot pin 51.

Thus, during the manufacturing of the seat 1 according to the invention, for the mounting of the first backrest 3 on the seating portion frame 2, the first backrest 3 is positioned in the first position relative to the pivot pin 51, so as to be able to slide relative to the pivot pin 51 along the axis A51, and so that the first lateral portion 51L of the pivot pin 51 passes through the first housing 52 on both sides of the first wall 31 of the first backrest 3.

The first backrest 3 can then be pivoted relative to the pivot pin 51 about the axis A51 so as to be in one of said second positions, the rib 55 being facing, at least partially the first wall 31 of the first backrest 3, and so as to abut against the first wall 31 of the first backrest 3, during the sliding of the first backrest 3 relative to the pivot pin 51 along the axis A51, thus preventing the disengagement of the first backrest 3 of the pivot pin 51.

The rib 55 being oriented, from the bottom upwards in the clockwise direction, according to an angle A55 comprised between 30° and 60°, preferably between 35° and 55° relative to the vertical direction Z of the seat 1 about the axis A51 of the pivot pin 51, when the first backrest 3 is oriented substantially according to said vertical direction Z of the seat 1, as can be seen in the embodiment of FIG. 1, corresponding to a usual position of use of the seat 1 with a user having their back bearing against said first backrest 3, the rib 55 is facing the first wall 31 of the first backrest 3, at the junction zone between said first wall 31 and the support wall 32 of the back of a user of the first backrest 3, qui has a resistance to shearing, in the transversal direction Y of the seat 1, higher than the zone of the first wall 31, facing where rib 55 would be, if it were oriented, from the bottom upwards in the clockwise direction, with an angle comprised between −20° and +20° relative to the vertical direction Z of the seat 1 about the axis A51 of the pivot pin 51, which is separated from the junction zone between the first wall 31 and the support wall 32 of the first backrest 3, and as in the seats of the prior art.

Thus, during an impact received by said seat 1 according to the invention, and in particular by the first backrest 3, when said first backrest 3 is oriented substantially in the vertical direction Z of the seat 1, for example in case of projection of an element located at the rear of the seat 1 against said first backrest 3, such as for example baggage located in the boot of the vehicle receiving said seat 1, said rib 55 will abut against said first wall 31 of the first backrest 3 but without damaging the latter and risking deforming the first housing 52.

The first backrest 3 therefore does not risk disengaging the pivot pin 51, and there is no risk for the safety of a user received on said first backrest 3 of the seat 1 according to the invention.

Moreover, such a design of the rib 55 of the pivot pin 51 hardly modifies the unfolding of the mounting operation of the first backrest 3 on the pivot pin 51 in relation to the seats of the prior art, such as described in the introduction of the present application, and the latter remains simple and fast to carry out.

Advantageously, the first housing 52 and the pivot pin 51 can be configured so that said first position of the first backrest 3 relative to the pivot pin 51 described hereinabove does not correspond to a normal position of use of the first backrest 3, i.e. a position of the first backrest 3 relative to the seating portion frame 2 about the transverse axis Y1, wherein a user cannot position their back bearing against the support wall 32 of the first backrest 3. Thus, there is no risk that the rib 55 and the first lateral portion 51L of the pivot pin 51 can pass through the first housing 52, when the first backrest 3 is in a position of use, and therefore the first backrest 3 disengages from the seating portion frame 2, when a user has their back bearing against said first backrest 3. Said first position can correspond to a mounting position of the first backrest 3 on the pivot pin 51.

Also, the first housing 52 and the pivot pin 51 can be configured so that there is a plurality of second positions, each corresponding, at least for a portion of them, to a normal position of use of the first backrest 3, i.e. a position of the first backrest 3 relative to the seating portion frame 2 about the transverse axis Y1, wherein a user can position their back bearing against the support wall 32 of the first backrest 3.

Figure 4:
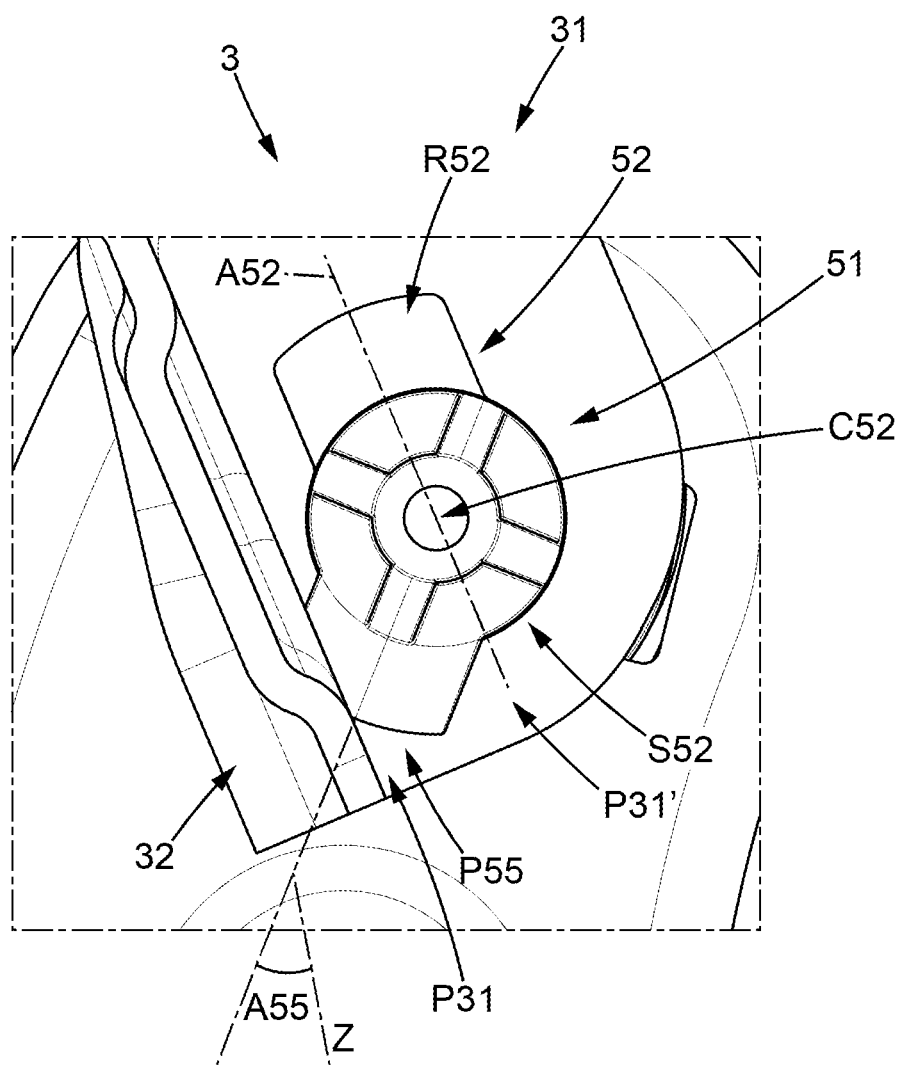
FIG. 4 shows a left detailed view of the common hinge of the seat of FIG. 1.
Figure 5:
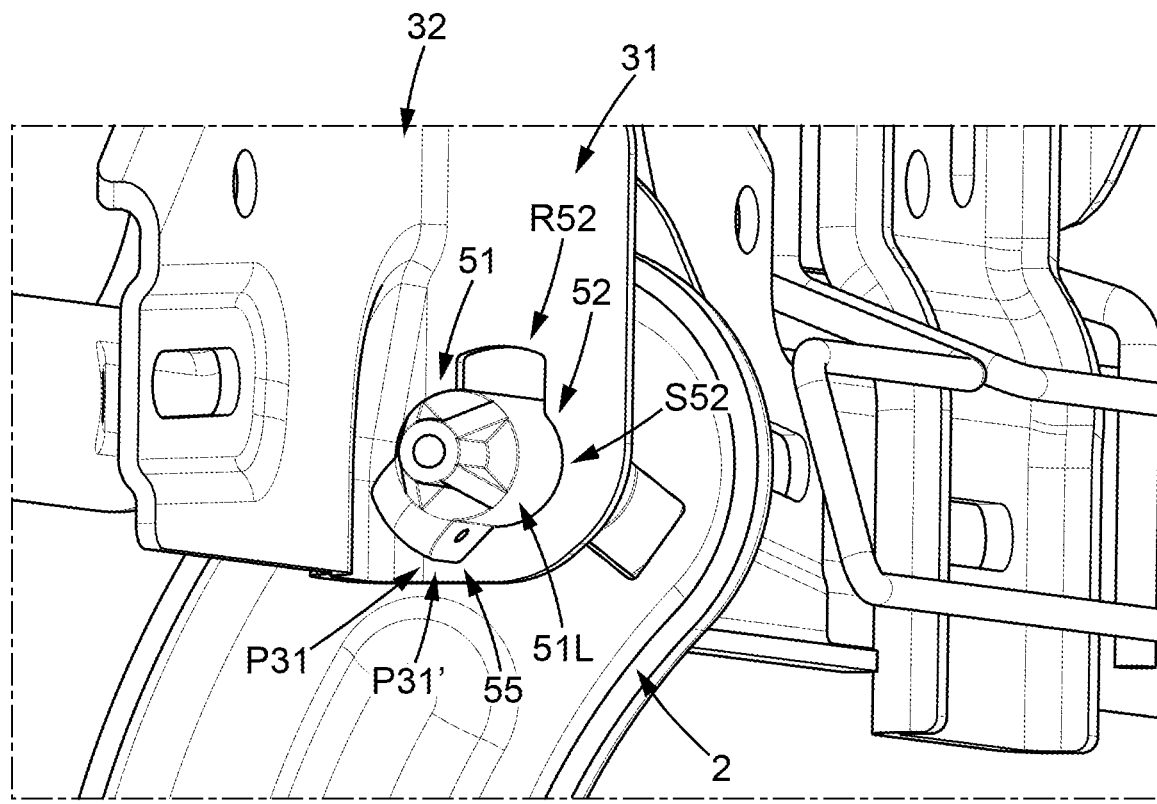
FIG. 5 shows a perspective detailed view of the common hinge of the seat of FIG. 1.

According to an embodiment, as can be seen in the embodiments of FIGS. 4 and 5, the rib 55 has a radial symmetrical substantially rectangular section relative to an axis A55 passing through the axis A51 of the pivot pin 51 and the first lateral portion 51L has a radial substantially circular section centred on the axis A51 of the pivot pin A51.

According to such an embodiment, the radial section of the rib 55 is of a shape substantially identical to the substantially rectangular portion R52 of the second housing 52 and the radial section of the first lateral portion 51L is of a shape that is substantially identical to the circular portion S52 of the first housing 52.

Thus, in said first position of the first backrest 3 relative to the pivot pin 51 described hereinabove, the rib 55 is facing the substantially rectangular portion R52 of the first housing 52, in the transversal direction Y of the seat 1, and the first lateral portion 51L of the pivot pin 51 is facing the circular portion S52 of the first housing 52, in the transversal direction Y of the seat 1.

In the same way, in the or in each one of said second positions of the first backrest 3 relative to the pivot pin, described hereinabove, the rib 55 is angularly offset about the axis A51 of the pivot pin 51 of the substantially rectangular portion R52 of the first housing 52, in the transversal direction Y of the seat 1.

According to an embodiment, the rib 55 has a radial end face F55 positioned at a distance D55 from the axis A51 of the pivot pin 51 strictly greater than the radius RS52 of the circular portion S52 of the first housing 52.

Thus, if the first backrest 3 is in a position relative to the pivot pin such that the rib 55 is facing the circular portion S52 of the first housing 52, in the transversal direction Y of the seat 1, corresponding to a second position of the first backrest 3 relative to the pivot pin 51, the rib 55 cannot pass through the first housing 52 by sliding along the axis A51 of the pivot pin 51.

According to an embodiment, the radius RS52 of the circular portion S52 of the first housing 52 is substantially equal, to the nearest sliding clearance, to the radius R51L of the radial section of the first lateral portion 51L of the pivot pin 51.

Thanks to this advantageous arrangement of the invention, and as can be seen in the embodiments of FIGS. 4 and 5, the first lateral portion 51L of the pivot pin 51 is maintained in the circular portion S52 of the first housing 52 by being stopped in translation according to the longitudinal direction X and in the vertical direction Z of the seat 1, so that, during the use of the seat 1 according to the invention, and in particular when the vehicle to which the seat 1 is fastened is moving, the first lateral portion 51L of the pivot pin 51 will not abut against the inner wall of the circular portion S52 of the first housing 52 and generate noise or damage it.

According to an embodiment, the substantially rectangular portion R52 of the first housing 52 has an axis of symmetry A52 passing through the centre C52 of the circular portion S52.

In such an embodiment, the first backrest 3 can have a support wall 32 of the back of a user, substantially planar extending in a plane P3, configured to receive as support, via a backrest cushion (not shown) the back of a user.

In such an embodiment, the axis of symmetry A52 of the substantially rectangular portion R52 of the first housing 52 can extend substantially parallel to the plane P3 of the backrest 3.

Thus, as can be seen in the embodiments of FIGS. 4 and 5, the first housing 52 is positioned such that the first position of the first backrest 3 relative to the pivot pin 51, such as described hereinabove, corresponds to a position of the first backrest 3 relative to the seating portion frame 2 about the first transverse axis Y1 inclined towards the rear and the bottom of the seating portion frame 2, by a value comprised between 0° and 30° relative to the longitudinal direction X of the seat 1, in the anti-clockwise direction.

This makes it possible that, as explained hereinabove, said first position of the first backrest 3 relative to the pivot pin 51 does not correspond to a normal position of use of the first backrest 3, wherein a user can position their back bearing thereon.

According to an embodiment, the first wall 31 of the first backrest 3 extends protruding from the support wall 32 of the first backrest 3, in a direction substantially perpendicular to the plane P3 of said support wall 32.

In such an embodiment, and as can be seen more particularly in the embodiment of FIGS. 4 and 5, the first wall 31 can have a first portion P31 extending in the vicinity of the first housing 52 between the axis of symmetry A52 of the substantially rectangular portion R52 of the first housing 52 and the plane P3 of the support wall 32 of the first backrest 3, and defining an angle comprised between 30° and 60°, preferably between 40° and 50° relative to the axis of symmetry A52 of the substantially rectangular portion R52 of the first housing 52, from the circular portion S52 to the substantially rectangular portion R2 in the clockwise direction.

In such an embodiment, the first wall 31 can have a second portion P31' extending in the vicinity of the circular portion S52 of the first housing 52, and defining an angle comprised between −20° and +20°, preferably between −10° and +10° relative to the axis of symmetry A52 of the substantially rectangular portion R52 of the first housing 52, from the circular portion S52 to the substantially rectangular portion R52 in the clockwise direction.

According to such an embodiment the first position P31 of the first wall 31 can have a resistance to shearing in the direction of the axis A51 of the pivot pin 51 greater than that of the second portion P31', in particular comprised between 500 MPa and 900 MPa, preferably between 600 MPa and 800 MPa.

Thus, when the first backrest 3 is in the or in at least one portion of the second positions of the first backrest 3 relative to the pivot pin A51, such as described hereinabove, and in particular the second positions corresponding to positions of use of the first backrest 3, said rib 55 is facing said first portion P31 of the first wall 31 of the first backrest 3 and offset from said second portion P31'. Therefore, if the first backrest 3 slides relative to the pivot pin 51 along the axis A51, the latter will strike said first portion P31, having a resistance to shearing in the direction of the axis A51 of the pivot pin 51 greater than that of the second portion P31' without risking deteriorating it.

Indeed, the second portion P31' of the first wall 31 has a resistance to shearing in the direction of the axis A51 of the pivot pin 51 less than 500 MPa, generally around 400 MPa.

Contrary to the seats of the prior art, the rib is facing said second portion of the first wall of the first backrest and is offset from said first portion. This second portion having a resistance to shearing in the direction of the axis of the pivot pin less than that of the first portion, it risks being deteriorated in case of impact with the rib.

Thus, the rib 55 can be provided to be facing the first position P31 of the first wall 31 of the first backrest 3, in the transversal direction Y of the seat 1, when the backrest 3 is oriented substantially in the vertical direction Z of the seat 1, corresponding in particular to a position of use of said first backrest 3.

According to an embodiment, the first backrest 3 has a first width W3 in the transversal direction Y of the seat 1 and the second backrest 4 has a second width W4 in the transversal direction Y of the seat 1, the first width W3 of the first backrest 3 being strictly less than the second width W4 of the second backrest 4, preferably so that the width W3 of the first backrest 3 is substantially equal to ⅔ of the width W4 of the second backrest 4.

Indeed, the seat 1 according to the invention is particularly adapted to belong to a bench, generally provided to receive three users sitting side by side, and generally positioned in the second, even in the third row of seats of a vehicle, with the first row of seats corresponding to that which comprises the seat of the driver of the vehicle. The first backrest 3 is generally provided to be at the centre of the bench, in the transversal direction Y of the seat 1, and therefore of the bench, between the second backrest 4 and the backrest of another seat (not shown).

The first backrest 3 is generally provided to be positioned at the centre of the vehicle receiving the seat 1 according to the invention, in the transversal direction of the vehicle, corresponding generally to the transversal direction Y of the seat 1. The second backrest 4 can be provided to be positioned in the vicinity of a lateral end of the vehicle, in the transversal direction of the vehicle, and in particular in the vicinity of a lateral door of the vehicle.

According to an embodiment, the rib 55 is referred to as first rib 55, the first lateral portion 51L having a second rib 55' protruding in a radial direction from the pivot pin 51 and extending opposite the axis A51 of the pivot pin 51, of radial section substantially identical to the radial section of the first rib 55 and positioned facing and in the extension of said first rib 55 in the direction of the axis A51 of the pivot pin 51, the first rib 55 and the second rib 55' being separated by a distance D55', in the direction of the axis A51 of the pivot pin 51, substantially equal to the thickness E31 of the first wall 31 of the first backrest 3, to the nearest pivot clearance.

Thus, thanks to the presence of said second rib 55' in complement of said first rib 55, when the first backrest 3 is in the or in each one of said second positions relative to the pivot pin 51, such as described hereinabove, the translation of the pivot pin 51 relative to the first backrest 3 along the axis A51 of the pivot pin 51 is prevented in the two directions of the axis A51, so as to provide an optimum maintaining of the first backrest 3 on the pivot pin 51.

All of the arrangements described hereinabove relating to the first rib 55 can be applied to the second rib 55'.

The invention also relates to a method for manufacturing a seat 1 according to one of the embodiments described hereinabove, comprising:

the fastening of the pivot pin 51 to the frame 2 of the seat 1 in such a way that the rib 55 is oriented, from the bottom upwards in the clockwise direction, with an angle A55 comprised between 30° and 60°, preferably between 35° and 55° relative to the vertical direction Z of the seat 1 about the axis A51 of the pivot pin 51, the sliding of the first backrest 3 relative to the pivot pin 51 according to the axis A51 of the pivot pin 51 with the backrest 3 being in said first position relative to the pivot pin 51 about the axis A51 of the pivot pin 51, in such a way that the first lateral portion 51L and the rib 55 slide through the first housing 52 according to the axis A51 of the pivot pin 51, the pivoting of the first backrest 3 about the axis A51 of the pivot pin 51 so that the backrest 3 is in said at least one second position of the first backrest 3 relative to the pivot pin 51 about the axis A51 of the pivot pin 51, so that the rib 55 is, at least partially, facing the first wall 31 of the first backrest 3 in the vicinity of the first housing 52, in the direction of the axis A51 of the pivot pin 51.

All of the arrangements described hereinabove relating to the manufacturing of the seat 1 according to the invention, and the mounting of the first backrest 3 on the seating portion frame 2, apply to the method of manufacturing a seat 1 according to the invention.

In particular, such a method makes it possible to obtain a resistant fastening of the first backrest 3 to the seating portion frame 2 of the 1, as explained hereinabove.

Also, also as explained hereinabove, such a method is simple and rapid to implement, and for a reduced cost price.

The invention relates finally to a vehicle comprising a vehicle seat 1 according to one of the embodiments described hereinabove.

The vehicle can in particular be an automobile vehicle.

All of the arrangements described hereinabove relating to a vehicle receiving the seat 1 according to the invention apply to the vehicle according to the invention.

In particular, and as explained hereinabove, the first backrest 3 can be positioned substantially at the centre of the vehicle in the transversal direction of the vehicle, and the second backrest 4 can be positioned in the vicinity of a lateral end of the vehicle, and in particular in the vicinity of a lateral door of the vehicle.

Naturally, other embodiments could have been considered by those skilled in the art without however leaving the scope of the invention defined by the claims hereinafter.

The invention claimed is:

1. A vehicle seat configured to accommodate at least two users, the vehicle seat comprising a transverse axis and a vertical direction, the vehicle seat comprising:

a seating portion frame, intended for being connected to the floor of a vehicle, a first backrest which is pivotally hinged to the seating portion frame according to the transverse axis of the vehicle seat, and the first backrest comprising a first wall, a second backrest which is pivotally hinged to the seating portion frame according to the transverse axis of the vehicle seat, adjacent to the first backrest, and the second backrest comprising a second wall, wherein the first backrest and the second backrest are connected to the seating portion frame via a common hinge, positioned in an intermediate zone of the seating portion frame, that pivots about the transverse axis of the vehicle seat, wherein said common hinge includes:

a pivot pin of an axis coincident with the transverse axis of the vehicle seat, comprising a central portion, a first lateral portion and a second lateral portion, the two lateral portions being positioned on either side of the central portion according to the axis of the pivot pin, a first housing arranged on the first wall of the first backrest and receiving interiorly the first lateral portion of the pivot pin, by authorizing the rotation of the first backrest relative to the pivot pin about the axis of said pivot pin, a second housing arranged on the second wall of the second backrest and receiving interiorly the second lateral portion of the pivot pin, by authorizing the rotation of the second backrest relative to the pivot pin about the axis of said pivot pin, a third housing, arranged on the seating portion frame, and receiving interiorly the central portion of the pivot pin, the central portion being maintained immobile in the third housing and so that the pivot pin is maintained immobile relative to the seating portion frame, wherein the first lateral portion has a rib protruding in a radial direction from the pivot pin and extending opposite the axis of the pivot pin, and wherein the first housing has a substantially keyhole shape, complementary with the radial section of the first lateral portion of the pivot pin and of the rib, with a circular portion of centre and a substantially rectangular portion communicating together, the substantially rectangular portion being positioned above the circular portion of the first housing, in the vertical direction of the vehicle seat, when the first backrest is in a raised position, oriented substantially in the vertical direction of the vehicle seat, wherein said first housing and said first lateral portion of the pivot pin are configured so that:

in a first position of the first backrest, relative to the pivot pin about the axis of the pivot pin, the first lateral portion and the rib are able to slide through the first housing according to the axis of the pivot pin, and in at least one second position of the first backrest relative to the pivot pin about the axis of the pivot pin, the sliding of the first lateral portion and the rib through the first housing according to the axis of the pivot pin, is prevented, the rib being, at least partially, facing the first wall in the vicinity of the first housing, in the direction of the axis of the pivot pin, wherein the rib is oriented, from the bottom upwards in the clockwise direction, according to an angle comprised between 30° and 60° relative to the vertical direction of the vehicle seat about the axis of the pivot pin.

2. The vehicle seat of claim 1, wherein the rib has a radial symmetrical substantially rectangular section relative to an axis passing through the axis of the pivot pin and the first lateral portion has a radial substantially circular section centred on the axis of the pivot pin, and wherein the radial section of the rib is of a shape substantially identical to the substantially rectangular portion of the second housing and the radial section of the first lateral portion is of a shape that is substantially identical to the circular portion of the first housing.

3. The vehicle seat of claim 2, wherein the rib has a radial end face positioned at a distance from the axis of the pivot pin strictly greater than the radius of the circular portion of the first housing.

4. The vehicle seat of claim 2, wherein the radius of the circular portion of the first housing is substantially equal, to the nearest sliding clearance, to the radius of the radial section of the first lateral portion of the pivot pin.

5. The vehicle seat of claim 1, wherein the substantially rectangular portion of the first housing has an axis of symmetry passing through the centre of the circular portion, wherein the first backrest has a support wall of the back of a user, substantially planar extending in a plane, configured to receive as support, via a backrest cushion the back of a user, and wherein the axis of symmetry of the substantially rectangular portion of the first housing extends substantially parallel to the plane of the backrest.

6. The vehicle seat of claim 5, wherein the first wall of the first backrest extends protruding from the support wall of the first backrest, in a direction substantially perpendicular to the plane of said support wall, wherein the first wall has a first portion extending in the vicinity of the first housing between the axis of symmetry of the substantially rectangular portion of the first housing and the plane of the support wall of the first backrest, and defining an angle comprised between 30° and 60° relative to the axis of symmetry of the substantially rectangular portion of the first housing, from the circular portion to the substantially rectangular portion in the clockwise direction, and wherein the first wall has a second portion extending in the vicinity of the circular portion of the first housing, and defining an angle comprised between −20° and +20° relative to the axis of symmetry of the substantially rectangular portion of the first housing, from the circular portion to the substantially rectangular portion in the clockwise direction, and wherein the first position of the first wall has a resistance to shearing in the direction of the axis of the pivot pin greater than that of the second portion.

7. The vehicle seat of claim 6, wherein the first portion has a resistance to shearing in the direction of the axis of the pivot pin comprised between 500 MPa and 900 MPa.

8. The vehicle seat of claim 7, wherein the resistance to shearing is between 600 MPa and 800 MPa.

9. The vehicle seat of claim 6, wherein the rib is provided to be facing the first position of the first wall of the first backrest, in the transversal direction of the vehicle seat, when the backrest is oriented substantially in the vertical direction of the vehicle seat.

10. The vehicle seat of claim 6, wherein the angle of the first portion is between 40° and 50°.

11. The vehicle seat of claim 6, wherein the angle of the second portion is between −10° and +10°.

12. The vehicle seat of claim 1, wherein the first backrest has a first width in the transversal direction of the vehicle seat and the second backrest has a second width in the transversal direction of the vehicle seat, the first width of the first backrest being less than the second width of the second backrest.

13. The vehicle seat of claim 12, wherein the width of the first backrest is substantially equal to ⅔ of the width of the second backrest.

14. The vehicle seat of claim 1, wherein the rib is referred to as first rib, the first lateral portion having a second rib protruding in a radial direction from the pivot pin and extending opposite the axis of the pivot pin, of radial section substantially identical to the radial section of the first rib and positioned facing and in the extension of said first rib in the direction of the axis of the pivot pin, the first rib and the second rib being separated by a distance, in the direction of the axis of the pivot pin, substantially equal to the thickness of the first wall of the first backrest, to the nearest pivot clearance.

15. The vehicle seat of claim 1, wherein the angle is between 35° and 55°.

16. A method for manufacturing a vehicle seat according to claim 1, comprising:

fastening the pivot pin to the frame of the seat in such a way that the rib is oriented, from the bottom upwards in the clockwise direction, with an angle comprised between 30° and 60° relative to the vertical direction of the seat about the axis of the pivot pin, sliding the first backrest relative to the pivot pin according to the axis of the pivot pin with the backrest being in said first position relative to the pivot pin about the axis of the pivot pin, in such a way that the first lateral portion and the rib slide through the first housing according to the axis of the pivot pin, pivoting the first backrest about the axis of the pivot pin so that the backrest is in said at least one second position of the first backrest relative to the pivot pin about the axis of the pivot pin, so that the rib is, at least partially, facing the first wall of the first backrest in the vicinity of the first housing, in the direction of the axis of the pivot pin.

17. The method of claim 16, wherein the angle is between 35° and 55°.

18. A vehicle comprising at least one vehicle seat according to claim 1.

19. The vehicle according to claim 18, wherein the first backrest is positioned substantially at the centre of the vehicle in the transversal direction of the vehicle, and the second backrest is positioned in the vicinity of a lateral end of the vehicle, and in particular in the vicinity of a lateral door of the vehicle.

* * * * *